Nov. 12, 1963 LE ROY R. MALECK 3,110,161
FLOAT SWITCH ASSEMBLY FOR AIR CONDITIONING APPARATUS
Filed April 4, 1962 2 Sheets-Sheet 1

INVENTOR.
LeRoy R. Maleck
BY James T. Barr
ATTY.

Nov. 12, 1963 LE ROY R. MALECK 3,110,161
FLOAT SWITCH ASSEMBLY FOR AIR CONDITIONING APPARATUS
Filed April 4, 1962 2 Sheets-Sheet 2
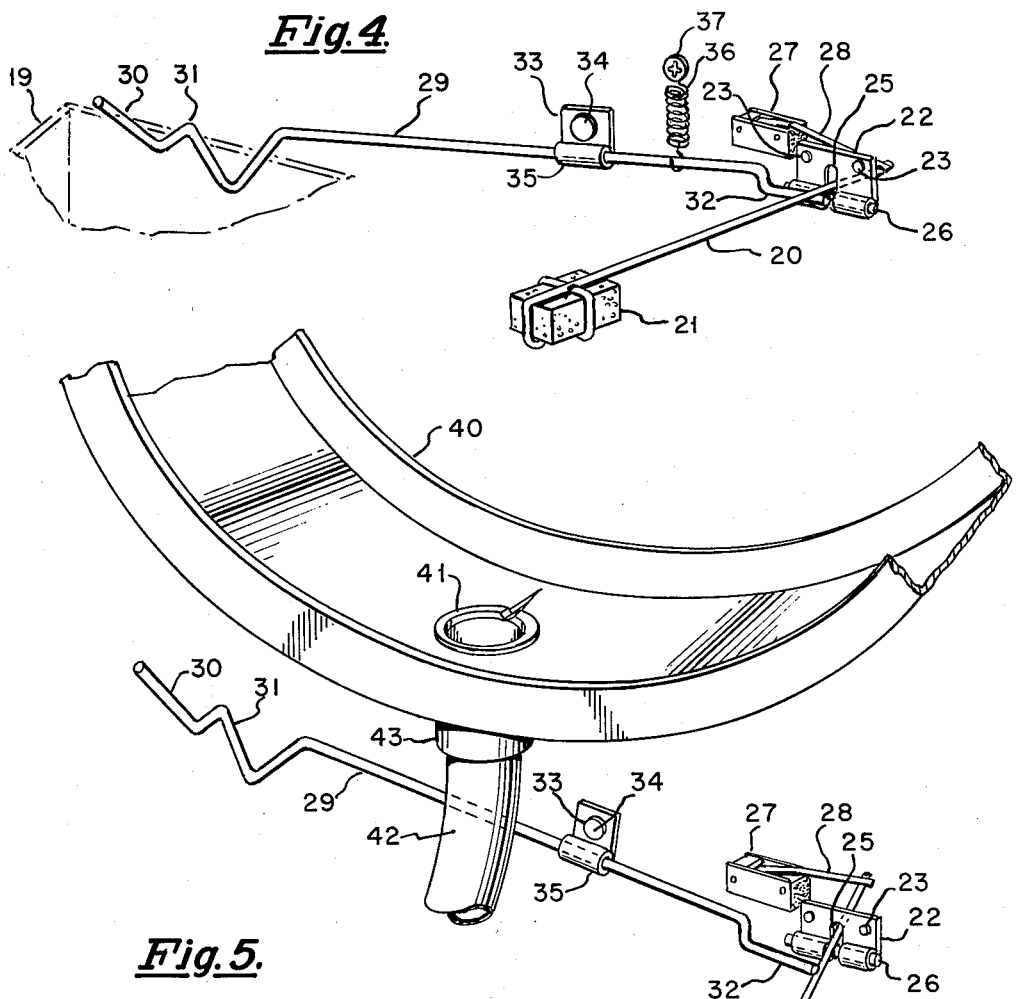
INVENTOR.
LeRoy R. Maleck
BY
James T. Barr
ATTY.

3,110,161
FLOAT SWITCH ASSEMBLY FOR AIR
CONDITIONING APPARATUS
Le Roy R. Maleck, Galesburg, Ill., assignor to Admiral Corporation, Chicago, Ill., a corporation of Delaware
Filed Apr. 4, 1962, Ser. No. 185,034
7 Claims. (Cl. 62—138)

This invention relates to air conditioning apparatus, especially dehumidifiers, and more particularly to means for preventing the condensate collected therein from overflowing its receptacle and for allowing easy removal of the receptacle.

In the past, various means have been proposed for de-energizing the apparatus before the condensate overflows. For example, some of these means have been of the kind that are responsive to the weight of the condensate collected and others have been of the liquid level responsive type. This latter type has included receptacles having divided compartments therein so that when one compartment is filled the condensate spills over into the other compartment causing the receptacle to pivot about a balance point to deenergize the apparatus, and float switches which are responsive to the level of condensate collected in the receptacle. Each of the means disclosed by the prior art has been unsatisfactory for one reason or another.

This invention is concerned with the last-mentioned type, that is, a float switch assembly. Of the various types of means mentioned, float switches have proved to be the most satisfactory, however they also have been subject to various disadvantages. For example, in the past in order to remove the receptacle it has been necessary to manually raise the float arm out of the way of the receptacle. This is an unpleasant task due to the location of the receptacle and float arm, and has been frequently objected to. Also, when the float arm is released in order to attend to emptying the receptacle the apparatus is again activated causing condensate to be spilled out on the floor.

It is therefore the principal object of thise invention to provide a new and improved float switch which eliminates these prior disadvantages as well as providing a number of additional advantages.

It is a further object of this invention to provide a new and improved float switch assembly which permits the condensate receptacle to be easily removed from the air conditioning apparatus.

It is a still further object of this invention to provide a new and improved float switch assembly which maintains the air conditioning apparatus inoperative when the condensate receptacle is removed.

It is a still further object of this invention to provide a new and improved float switch assembly wherein the float and float arm are automatically lowered into the condensate receptacle and the air conditioning apparatus is rendered operative when the receptacle is replaced within the air conditioning apparatus.

In furtherance of this object, a dehumidifier is provided with a float switch assembly which senses the water level in the condensate receptacle, and when the water level reaches a predetermined height, it turns the dehumidifier off. When the condensate receptacle is removed, an actuating lever, which normally rests on the edge of the condensate receptacle, drops downward in response to the action of a spring, and the float arm is lifted up out of the way. The actuating lever, and therefore the float arm, remans in this position until the receptacle is replaced, and the dehumidifier is rendered inoperative. The actuating lever is provided with an upwardly angled cam surface and as the receptacle is replaced it engages this surface and the actuating lever is forced back to its normal position, resting on the edge of the receptacle. The float arm is again lowered, actuating the dehumidifier.

It is a still further object of this invention to provide a new and improved float switch assembly which may be rendered ineffective to allow the air conditioning apparatus to be operated with, for example, a drain hose.

The float switch assembly also allows the dehumidifier to be operated without a condensate receptacle, as with a drain hose. The actuating lever can be manually raised high enough that it will not interfere with the float arm, and the float arm is dropped down below the actuating lever. With the float arm in this position the actuating lever has no effect and the dehumidifier remains operative.

The other various objects, features and advantages of this invention will become apparent from the following description and claims taken in conjunction with the accompanying drawings.

In these drawings:

FIG. 4 is a view showing the float switch assembly when the receptacle is removed;

FIG. 5 shows the float switch assembly when the dehumidifier is prepared for operation using a hose.

Figures 1, 2, 3:
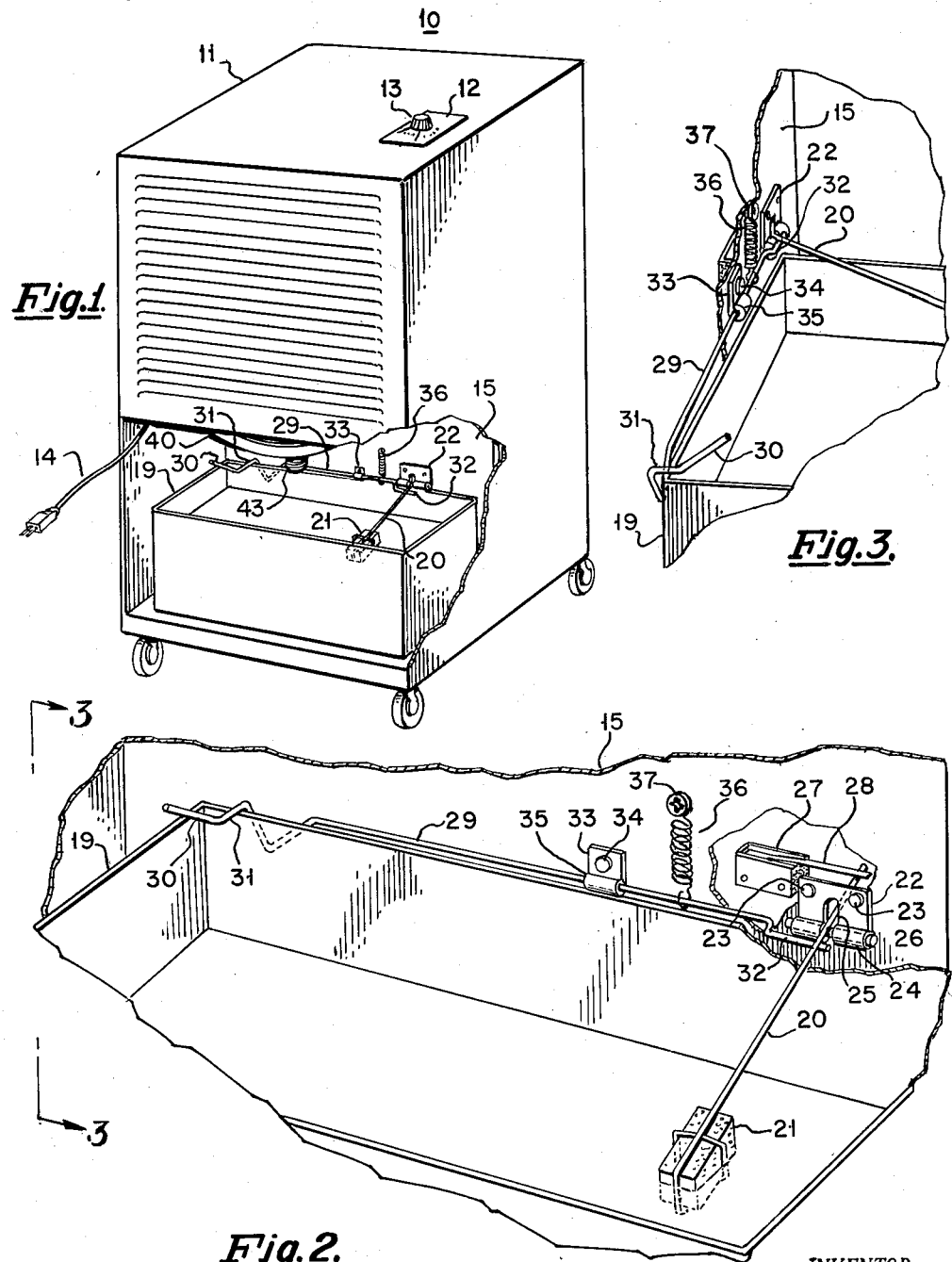
FIG. 1 shows a dehumidifier, with part of its cabinet cut-away, using the float switch assembly contemplated by this invention.
FIG. 2 is an enlarged cut-away view showing the float switch assembly.
FIG. 3 is a sectional view of the float switch assembly taken along the line 3—3.

Referring now to the drawings wherein like elements are indicated with like reference characters in each of the various figures, FIG. 1 shows a typical dehumidifier 10 which includes the usual components generally found in a dehumidifier, such as, for example, a motor-compressor, a condenser and an evaporator, none of which are shown. A humidistat 12 mounted on top of cabinet 11 switches dehumidifier 10 on when the humidity rises and switches it off when the humidity falls. Dehumidifier 10 is turned on and off and the degree of condensate removal is adjusted by means of control knob 13. Power is supplied to operate dehumidifier 10 by plugging cord 14 into an electrical outlet.

Condensate which is formed in dehumidifier 10 in the manner well known in the art is collected in trough 40 and drained into the receptacle 19. A float switch assembly in accordance with this invention is mounted on upright wall 15 and turns dehumidifier 10 off when the water level in receptacle 19 rises to a predetermined level, in a manner as will be hereinafter described.

Referring now to FIGS. 2 and 3, float arm 20 having float 21, which may be of any suitable buoyant material such as cork, is mounted normal to the upright wall 15 by means of bracket 22 which is secured to upright wall 15 with screws or rivets 23. Float arm 20 is secured to rod 26 housed in cylinder 24 formed on one end of bracket 22 and arranged to freely rotate therein to allow float arm 20 to be raised or lowered. Float arm 20 extends through aperture 25 in bracket 22 and upright wall 15 and engages blade 28 on microswitch 27, which is serially connected in the electrical circuit controlling the on-off state of dehumidifier 10. When the water level and hence float 21 and float arm 20 is below the height which has been established as the height at which dehumidifier 10 is to be turned off, blade 28 is raised by the end of float arm 20, as shown in FIG. 2, and dehumidifier 10 is held on. As the water level rises, float arm 20 and float 21 rise and, at the predetermined height at which dehumidifier 10 is to be shut off, float arm 20 will become disengaged from blade 28 of microswitch 27, as shown in FIG. 4, turning dehumidifier 10 off.

Dehumidifier 10 will now remain off until the receptacle 19 is removed, or emptied.

Actuating lever 29 and spring 36 are provided to facilitate the removal of receptacle 19. Actuating lever 29 is supported by means of bracket 33, which is attached to upright wall 15 by pivot pin 34 in such a manner that bracket 33 may pivot relative to upright wall 15. Actuating lever 29 is secured in the cylinder 35 of bracket 33 in such a manner that it cannot rotate relative to bracket 33. The left end, as shown, of actuating lever 29 is formed with an upwardly angled cam surface 30 and a surface 31 which is generally parallel to receptacle 19. Spring 36 is secured at one end to upright wall 15 by fastener 37 and at the other end to actuating lever 29. Spring 36 is normally under tension when receptacle 19 is positioned within dehumidifier 10 and biases surface 31 of actuating lever 29 against the rear edge of receptacle 19.

When receptacle 19 is withdrawn from dehumidifier 10, the rear edge of receptacle 19 slides along surface 31 and upwardly angled cam surface 30 until receptacle 19 is clear of actuating lever 29. As soon as the rear edge of receptacle 19 is clear, spring 36 contracts to its normal configuration, pulling the right end, as shown, of actuating lever 29 upward causing it to pivot with bracket 33. The end 32 of actuating lever 29, on being raised, engages float arm 20 and, in turn, causes float arm 20 and float 21 to be raised up free of the receptacle 19. The float arm 20 will remain raised in this fashion as long as receptacle 19 is removed, due to the action of the spring 36 and the actuating lever 29. It may therefore be noted that dehumidifier 10 remains off when receptacle 19 is removed since the end of float arm 20 is not engaged with blade 28 of microswitch 27.

When receptacle 19 is replaced, the rear edge of receptacle 19 engages upwardly angled cam surface 30 and cams the left end of actuating lever 29, as shown in FIG. 4, to raise it to its normal position, resting surface 31 on the rear edge of receptacle 19. Actuating lever 29 pivots with bracket 33, lowering its right end which, in turn, allows float arm 20 to pivot with rod 26 back into the receptacle 19. Float arm 20 again engages blade 28 of microswitch 27 to turn on dehumidifier 10.

In FIG. 5 is shown an alternate manner of using dehumidifier 10, that is, by using a drain hose instead of the receptacle 19. When using a drain hose, actuating lever 29 must be disengaged from float arm 20 since receptacle 19 is removed and actuating lever 29 would turn dehumidifier 10 off, in the manner previously described. To disengage actuating lever 29, the left end, as shown, of actuating lever 29 is raised until float arm 20 falls free of it. Float arm 20 remains as if it were lowered into the receptacle 19 and blade 28 of microswitch 27 is raised, as shown, turning dehumidifier 10 on. A drain hose 42 is connected to coupler 43 of trough 40 and the condensate which is collected in trough 40 flows through aperture 41 and drain hose 42.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. In air conditioning apparatus of the type including a container for collecting condensate, a float switch assembly comprising, in combination:
   (a) a switch for controlling the operation of said air conditioning apparatus;
   (b) a float;
   (c) a float arm affixed to said float and adapted for vertical movement about a pivot for controlling the operation of said switch;
   (d) a control arm for raising said float arm and said float above said container; and
   (e) biasing means for biasing said control arm to normally engage said container and for raising said control arm to raise said float arm and said float above said container upon the removal of said container.

2. In air conditioning apparatus of the type including a container for collecting condensate, a float switch assembly, as claimed in claim 1, wherein said control arm has at one end thereof an upwardly angled cam surface for automatically returning said control arm to its normal position upon the replacement of said container, whereby said float arm and said float are lowered to their normal positions.

3. In air conditioning apparatus of the type including a container for collecting condensate, a float switch assembly, as claimed in claim 1, wherein said control arm may be pivoted out of the plane of movement of said float arm to permit said float arm and said float to extend downwardly to operate said switch, thereby maintaining said air conditioning apparatus operative.

4. In air conditioning apparatus of the type including a container for collecting condensate, a float switch assembly comprising, in combination:
   (a) a switch for controlling the operation of said air conditioning apparatus;
   (b) a float;
   (c) a float arm affixed to said float and adapted for vertical movement about a pivot for controlling the operation of said switch;
   (d) a control arm engaging said float arm for raising said float arm and said float above said container; and
   (e) a spring connected to said control arm and normally biasing said control arm to engage said container, said spring operated upon the removal of said container from said air conditioning apparatus to raise said control arm, whereby said float arm and said float are raised above said container.

5. In air conditioning apparatus of the type including a container for collecting condensate, a float switch assembly comprising, in combination:
   (a) a switch for controlling the operation of said air conditioning apparatus;
   (b) a float arm pivotally mounted in said air conditioning apparatus and engaging said switch for controlling the operation of said switch;
   (c) a float attached to one end of said float arm to raise and lower said float arm depending upon the level of condensate collected in said container, said float arm operating said switch when the level of condensate in said container reaches a predetermined height to render said air conditioning apparatus inoperative;
   (d) pivotal support means mounted in said air conditioning apparatus;
   (e) a control arm secured in said pivotal support means, one end of said control arm having an upwardly angled cam surface and normally engaging said container, the other end of said control arm being positioned to engage said float arm to raise said float arm and said float above said container; and
   (f) a spring connected to said control arm and to said air conditioning apparatus and normally biasing said one end of said control arm to engage said container, said spring operated upon removal of said container from said air conditioning apparatus to cause said control arm to pivot with said pivotal support means to engage said float arm, whereby said float and said float arm are raised above said container.

6. In air conditioning apparatus of the type including a container for collecting condensate, a float switch assembly, as claimed in claim 5, wherein said upwardly angled cam surface is adapted to engage the edge of said container when said container is replaced in said air conditioning apparatus and to cam said control arm to cause it to pivot with said pivotal support means to its normal position, whereby said control arm is disengaged from said float arm and said float and said float arm are lowered to their normal positions in said container.

7. In air conditioning apparatus of the type including a container for collecting condensate, a float switch assembly, as claimed in claim 5, wherein said control arm may be pivoted with said pivotal support means out of the plane of movement of said float arm to permit said float arm and said float to extend downwardly to operate said switch, thereby maintaining said air conditioning apparatus operative.

References Cited in the file of this patent

UNITED STATES PATENTS 3,044,272    Eisendrath _____ July 17, 1962